US005083638A

United States Patent [19]

Schneider

[11] Patent Number: 5,083,638

[45] Date of Patent: Jan. 28, 1992

[54] AUTOMATED POINT-OF-SALE MACHINE

[76] Inventor: Howard Schneider, 149 Finchley Road, Montreal, Quebec, Canada, H3X 3A3

[21] Appl. No.: 584,104

[22] Filed: Sep. 18, 1990

[51] Int. Cl.[5] .................... A47F 9/04; G01G 19/413

[52] U.S. Cl. .................... 186/61; 177/25.15; 235/383

[58] Field of Search .................... 186/61; 235/383; 364/466; 177/25.15, 50

[56] References Cited

U.S. PATENT DOCUMENTS

| | | | |
|---|---|---|---|
| 3,436,968 | 4/1969 | Unger et al. | 364/466 X |
| 3,836,755 | 9/1974 | Ehrat . | |
| 4,108,363 | 8/1978 | Susumu . | |
| 4,365,148 | 12/1982 | Whitney . | |
| 4,373,133 | 2/1983 | Clyne et al. . | |
| 4,676,343 | 6/1987 | Humble et al. . | |
| 4,775,782 | 10/1988 | Mergenthaler et al. | 186/61 X |
| 4,779,706 | 10/1988 | Mergenthaler . | |
| 4,787,467 | 11/1988 | Johnson | 235/383 X |
| 4,792,018 | 12/1988 | Humble et al. | 186/61 |
| 4,909,356 | 3/1990 | Rimondi et al. | 186/61 |
| 4,940,116 | 7/1990 | O'Conner et al. | 186/61 |
| 4,964,053 | 10/1990 | Humble | 186/61 X |

OTHER PUBLICATIONS

Shapiro, Eben, *Check It Out For Yourself*, The Montreal Gazette, p. B8, Aug. 5, 1990.

*Primary Examiner*—F. J. Bartuska

[57] ABSTRACT

An automated retail point-of-sale machine is disclosed having the ability to allow consumers to check out their purchases with a minimal of direct human assistance. The machine is designed to work with products whether labelled or not with machine readable bar codes. The machine possess security features which deter customers from fraudulently bagging items by comparing the weight changes on the packing scale with the product number related information in the case of labelleled products. In the case of nonlabelled products, experienced customers can identify the product through a series of menu choices while beginner customers can allow the supervisory employee to enter a product number abbreviated code, with additional visual and/or dimensional sensory information of the contents being relayed to a supervisory employee. The machine allows high shopper efficiency by minimizing customer handling of products by positioning the packing scale adjacent to the scanner and typically not requiring further handling of the purchased items until checkout is completed.

13 Claims, 7 Drawing Sheets

AUTOMATED POINT-OF-SALE MACHINE

FIELD OF THE INVENTION

The present invention relates to retail point-of-sale systems which allow the customer to check out purchased items with a minimum of operator intervention while preventing customer fraud.

BACKGROUND OF THE INVENTION

In most retail environments the customer selects various items for purchase and brings these items to an operator for checkout. The operator enters the price of each item selected, as well as a code particular to the item, into a point-of-sale terminal which then calculates the total amount the customer must pay. After payment is received the point-of-sale terminal calculates any change owing to the customer and produces a written receipt for the customer. Over the last two decades many retail products have been manufactured to contain a machine readable bar code. In response, many retail environments have incorporated an optical scanner into their point-of-sale systems. The operator is able to save time by scanning purchased items rather than having to manually key in price and product information. When the operator scans a product the optical scanner sends a signal corresponding to the product number to the data processing component of the point-of-sale terminal system. In the latter resides a product lookup table which quickly provides the price and the description of the scanned item.

Many inventions have been proposed over the last two decades to automate the point-of-sale terminal by having the customer scan the item himself/herself and then place the item on a checkout weighing receptacle. Since many items have predetermined weights, the point-of-sale terminal system need only compare the actual weight of the product placed on the checkout weighing device with the weight given by the product lookup table (i.e., along with the price and description information) to assure that the item placed on the checkout weighing receptacle is indeed the item scanned.

One early prior art system for automated checkout is described in Ehrat U.S. Pat. No. 3,836,755. Ehrat's invention consists of a shopping cart which contains a scanning and weighing apparatus and which in conjunction with an evaluation system evaluates the correspondence of weight with product designation. Another prior art system for automated checkout is described in Clyne U.S. Pat. No. 4,373,133. Clyne's invention consists of providing each customer's shopping cart with an electronic recording unit which is used by the customer to scan each item selected for purchase. The recording unit can contain a product lookup table to enable it to obtain weight and price information. When the customer wishes to check out, his/her collection of items is weighed to verify that the actual total weight corresponds with the total weight calculated by the electronic recording unit. One important limitation of Ehrat's and Clyne's inventions is their poor ability to deal with products not having a machine readable code. Another limitation is the risk of customer fraud if the customer easily substitutes a more expensive item having the same weight.

Improved systems for automated checkout are described in Mergenthaler U.S. Pat. No. 4,779,706, Johnson U.S. Pat. No. 4,787,467 and Humble U.S. Pat. No. 4,792,018. The Mergenthaler and Johnson inventions are quite similar. At a self-service station customers scan and weigh items (where weight is automatically checked against produce code) and then place items into a new cart (Johnson) or a bag (Mergenthaler) which is on a weighing receptacle. The new cart or new bags are then brought to a checkout station where it is verified that the weight of the cart or bags has not changed. The Humble invention passes items on a conveyer through a light tunnel after scanning. Not only is weight determined and verified against product number, but the product's dimensions can also be determined and verified against product number thereby making substitution of similar weight items difficult. The customer's items accumulate at the end of the light tunnel where they must later be bagged and presented to an operator for payment. To prevent customers from not scanning items and placing them at the end of the light tunnel for bagging, the Humble invention suggests the use of an electronic surveillance system in the pedestrian passage about the system.

The above inventions all have serious limitations with respect to customer fraud, shopping efficiency, non-coded products and use by nonexperienced users. In the Mergenthaler and Johnson patents, customer fraud remains an important problem as customers can scan a cheap item at the self-service station, discard it and immediately substitute a more expensive similarly weighing item. Despite the Humble patent's use of the light tunnel to determine item shape in addition to weight, the customer need only place an item at the bagging area without scanning it. The electronic surveillance system suggested by the Humble patent is not economical for retail enviroments such as supermarkets. As noted in the Shapiro article, "shoppers could conceivably put groceries directly from their carts into their shopping bags." In the Mergenthaler and Johnson patents, little attention is paid to shopper efficiency (as opposed to operator efficiency). Customers must handle items repeatedly to place them from one weighing station to another. The Humble invention also does a poor job with respect to shopper efficiency. After having scanned and placed all the purchased items on the conveyor, the customer must once again handle all the items during the bagging operation. The Johnson invention does make a limited provision for items not possessing a machine readable code by allowing customers to enter a code or price value. However, the items are not verified in any way by the invention. The Humble invention pays more attention to products not containing a machine readable. Customers are presented with selection on a computer screen and the invention attempts to verify the dimensions of the item correspond with the selection made. However, such correspondence is very limited. As a result, as the Shapiro article points out, "Fruits and vegetables present considerable problems . . . an employee is stationed in the produce department to weigh fruit and affix a coded label for the system to read." The Johnson and Mergenthaler inventions pay scant attention to user friendliness-an important consideration for non-experienced users. The Humble invention pays more attention to user friendliness with the incorporation of a touch-activated display screen. Nonetheless, as the Shapiro article notes, . . . "not delivered the promised labor savings . . . CheckRobot says one cashier can handle three to eight lanes. But because of the need to help confused customers . . . a cashier assigned to every two lanes and other employees hover around the machines to help customers."

SUMMARY OF THE INVENTION

The present invention describes a method and apparatus which allows consumers to check out their purchases with a minimal of direct human assistance. The present invention possesses significant improvements with respect to the prior art in the areas of customer fraud, shopping efficiency, non-coded products and use by non-experienced users.

The present invention consists of two major modules—the self-service unit utilized by the customer, herein referred to as the 'robot module' and the unit utilized by the store employee to supervise the operations of several robot modules, herein referred to as the 'supervisor module'. The customer presents himself/herself at any available robot module with the items he/she has selected for purchase. The customer scans a product item and then places it into a bag resting on a scale, herein referred to as the 'packing scale'. The electronic signals from the scanner and the scale go to an electronic computer which contains (or can access) a product lookup table allowing the increase of weight on the packing scale to be verified against product number. The customer repeats this operation for all remaining items. If a weight change does not correspond with the product number then the customer will receive an audio and/or visual prompt to this effect from the robot module. Prompts typically are simultaneously transmitted to the supervisor module. A bidirectional intercom system allows the supervisory employee to immediately help the customer with any difficulties and if necessary, via the supervisor module keyboard, directly enter commands or product information. When the customer has scanned and bagged all items selected for purchase, the customer goes to the supervisor module to pay, or if the robot module is so equipped, as it would typically be in the case of debit or credit cards, the customer remains at the robot module for payment. In either case, the customer is instructed to leave the bag on the packing scale alone. Removing the bag from the packing scale will cause a change in weight (or similarly, adding a non-scanned item to the bag will cause a change in weight) that will be noticed by the computer and cause warning to be given. Only after the computer receives a signal that payment has been received will it allow the bag from the packing scale to be removed without a warning prompt occurring. Note that the customer has handled each item only one time. The customer scans and then directly bags the item. The item nor the bag is not handled again until checkout is finished, thus allowing a high shopper efficiency. A small exception occurs if the customer has items too numerous to fit in the bag(s) on the packing scale in which case full bags are slid several inches to an adjacent larger 'storage scale' where weight changes are monitored by the computer.

To prevent the customer from scanning one item and substituting a more expensive item into the bag on the packing scale and to prevent the customer from placing a nonscanned item into his/her bags after payment, the present invention incorporates several innovative features. The robot module is physically constructed to contain no openings nor any folds nor any flat surfaces, except the limited but prominent surface adjacent to the scanner, where fraudulently substituted items could be discarded. The robot monitor contains a closed circuit video camera and video monitor to psychologically deter the customer from fraudulent activity. As well, a signal from the closed-circuit video camera showing the areas containing the floor, the shopping cart and the flat scanner area, is presented to the supervisory employee via the supervisor module after payment is received. The supervisory employee must press a key on the supervisor module keyboard to accept the video image (or avoid pressing a 'reject' button) to allow the computer to allow the customer to remove his/her bags without the occurence of an audiovisual warning. Note that the present invention requires the supervisory employee to observe the video image for only a second unlike the constant monitoring that is required of typical video surveillance systems.

Before the customer uses the robot module, he/she presses a button or switch indicating the level of experience he/she has with this type of automated point-of-sale machine. For 'beginner' customers, when they have an item not containing a machine readable bar code, as indicated by pressing a 'no bar code' button on the robot module, they will be instructed to place the item directly into the bag on the packing scale where its image (and/or possibly ultrasonic dimensions and/or dimensions obtained by breaking a light curtain above the bag) is sent to the supervisor module. The supervisory employee receives a prompt to examine the image and to enter the product number or a corresponding abbreviation of the new item. In the case of the 'experienced' customer, the computer monitor of the robot module will present the customer with a menu selection in order for the customer to qualitatively identify the product and optionally identify its quantity. After identification, typically involving pressing a button corresponding to a choice on a sub-menu, the customer is instructed to place the item in the bag on the packing scale. An image of the bag's new contents along with the customer's identification are presented to the supervisory employee via the supervisor module for verification. In the case of both the 'beginner' and 'experienced' customers, the weight change on the packing scale is evaluated by the computer with reference to the product number ultimately chosen to see if the weight change is reasonable. If the weight increase differs by more than the allowed tolerance for that product, then the supervisory employee will receive a prompt to inspect the transmitted video image with more care. Note that with only a small investment of the supervisory employee's time and with little confusion to the inexperienced user, that a product not bearing a machine readable code is accurately identified. In particular, note that the customer is not obligated to key in a series of product number digits to identify the product.

As mentioned above, in the case of nonlabelled products, an image and possibly the dimensions of the product are transmitted to the supervisor module for approval by the supervisory employee. For beginner customers, the supervisory employee will actually identify the product and if necessary its quantity (i.e., enter the product number or an abbreviation thereof and if necessary the quantity) while experienced customers are expected to identify the product typically through a series of menus displayed on a video display. Occasionally the customer will be expected to identify the quantity of the product as well, e.g., "4 apples." For the experienced customer, the supervisory employee then will verify that the customer has correctly identified the product and its quantity. As mentioned above, the weight of the product is nontheless evaluated by the computer to make sure that the weight increase on the packing scale corresponds reasonably with the product and its quantity. If poor correspondence is determined by the computer, then the supervisory employee will be prompted to verify the transmitted image with more care. Note that for both types of customers, and especially for the experienced customer, only a small amount of the supervisory employee's time is required. The supervisory employee is not expected to constantly watch a video screen as is typically done in close-circuit television surveillance systems. Rather, the supervisory employee receives the occasional prompt during a customer's order to look at the video screen for a moment for those products not bearing machine readable product codes. To maximize labor savings it is often advantageous to have one supervisory employee monitor as many as eight robot modules. In such a case, should two or more customers have nonlabelled products for verification by the supervisory employee at the same time, assuming that the customers are experienced customers and have identified the product, then it is useful after a certain period of time has elapsed, e.g., 3 seconds, to verify the product soley on its weight. For the occasional time when the supervisory employee is busy, this scheme maintains shopper efficiency without reducing overall security very much. It is possible to extend this scheme even further to maximize labor savings even more. By using additional sensory modalities in conjunction with the transmitted video images, it is possible to have one supervisory employee monitor more robot module without reducing shopper efficiency or overall security. By determining the dimensions of the product being placed into the bags on the packing scale, for the majority of nonlabelled products it will be sufficient to verify the dimensions and the weight of the product against its product code information to assure that the experienced customer is accurately and honestly identifying the product. Only for those cases where the computer has determined that the correspondence of measured dimensions and measured weight is poor, will it be necessary to use the supervisory employee's time to examine the transmitted image to make a final decision. Two methods of determining dimensions are readily available for use with the robot module. One method consists of placing in proximity to the packing scale a three-dimensional array of light beams and light detectors. The dimensions of the customer's hand holding the product and the dimensions of the customer's empty hand returning from the packing scale can be easily computed by the computer by following which light beams have been interrupted. Thus, by subtracting the dimensions of the empty hand from the dimensions of the hand plus product, net dimensions of the product can be calculated. Another method of determining dimensions involves placing ultrasonic transducers above the packing scale. The ultrasonic transducers and appropriate circuitry can measure the distance from their fixed position to the top of the contents in the packing scale bag(s). Thus, by observing the change in distances from the ultrasonic transducers to the tops of the contents in the packing scale bag(s), the computer can calculate net volume changes. This net measured volume can then be verified against the product number's stored volume limits.

FIGS. **4*a*–4*d*** is a flow-chart showing the logic steps associated with the invention.

DESCRIPTION OF THE PREFERRED EMBODIMENT

External Configuration

Figure 1:
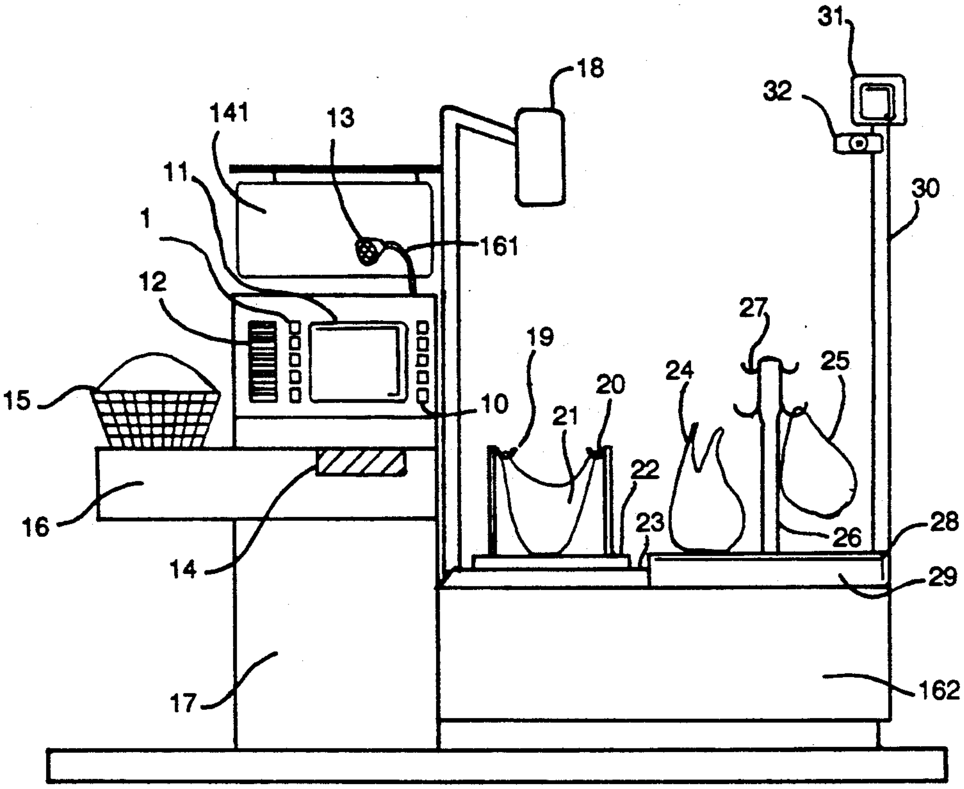
FIG. 1 is a perspective view showing the exterior configuration of a preferred embodiment of the 'robot module' portion of the invention.
Figure 2:
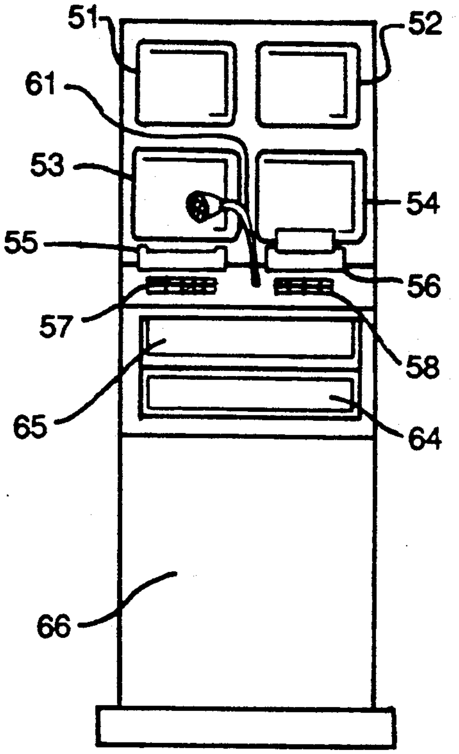
FIG. 2 is a perspective view showing the exterior configuration of a preferred embodiment of the 'supervisor module' of the invention.

Turning now to FIGS. 1 and 2 there is shown a preferred embodiment of the automatic POS machine. FIG. 1 shows the portion of the machine used by the consumer to checkout his/her purchases. This portion of the machine will herein be referred to as the 'robot module'. FIG. 2 shows the portion of the machine used by the store employee to supervise the operations of several 'robot modules'. This portion of the machine will herein be referred to as the 'supervisor module'. FIG. 2 depicts a supervisor module which is capable of supervising two robot modules.

Robot Module

The robot module, as shown in FIG. 1, instructs the consumer via a centrally located video display terminal 11. To communicate with the robot module, the consumer can press buttons 1 through 10. In the embodiment shown here the video display terminal would typically be a high resolution color graphical video display terminal and the buttons would be color coded switches. The buttons would be lined up precisely with the video display terminal 11 so that they could be used for many different functions. In other embodiments, the labelling or the quantity of the buttons could differ from the present embodiment. As well the video display terminal could be monochrome rather than color, and its size and location could differ from the present embodiment. It is possible, in a different embodiment of the present invention, to replace or supplement the combination of buttons 1 to 10 and the video display terminal 11, with a touch-sensitive video display terminal. Other embodiments of the present invention are also possible whereby the buttons 1 to 10 are replaced by other means of user interface, e.g., voice recognition circuitry, interruption of beams of light by a pointing finger, joystick, etc.

The robot module also instructs the consumer via a speaker system 12. Speaker system 12 consists of one or more audio speakers attached to one or more audio amplifiers. The speaker system 12 receives computer generated voice signals and computer generated tonalities from the computer portion 66 of the automatic POS machine. Speaker system 12 also receives speech signals from the microphone 61 at the supervisor module. Likewise, the consumer can communicate by voice with the employee supervising the automatic POS machine via microphone 13. Note that in the present embodiment microphone 13 attaches to the robot module via a flexible neck 161.

Sign 141 provides the consumer with information regarding the operation of the automatic POS machine, as well as advertising for services and products offered by the store.

Laser scanner 14 is capable of interpreting a bar coded label on a retail product. Bar coded labels, as one skilled in the art knows, represent digits and occasionally alphanumeric symbols, by a series of thin and thick bars. Many products sold at retail stores posses a bar coded label representing the manufacturer's product number for that product. Laser scanners are commercially available which scan with a moving laser beam the bar coded label on a product and produce an electrical signal representing that product's code number. An area 16 prior to the laser scanner allows consumers to prepare products for scanning. In FIG. 1, a shopping basket 15 is shown resting on area 16.

After a consumer scans a purchased item over the laser scanner 14, the consumer places the item into the plastic or paper bag 21 held in place by bag holders 19 and 20. Bag holders 19 and 20, as well as portions of bag 21, lie on platform 22. Platform 22 lies on a weighing scale 23, herein referred to as the 'packing scale'.

For the sake of simplicity, in the embodiment being discussed here, 18 is considered to be a sensor transmitting only images of the contents of bag 21 to the supervisor module. Thus, in the embodiment being discussed here, sensor 18 will be referred to also as 'sensor/video camera' 18. However, as mentioned above, sensor 18 may in other embodiments contain a three-dimensional array of light beams and detectors which measure the dimensions of the customer's hand and product going to the bag 21 and the customer's empty hand returning from bag 21 thus allowing computation of the net dimensions of the product. Sensor 18 may also contain an plane of ultrasonic transducers which measure the distance from the fixed position of sensor 18 to the top of the contents of the bag 21. By noting the change in these distances after a product is placed is bag 21, it is possible to compute the volume of the product. Other embodiments of the present invention are thus possible where sensor 18 consists of a video camera and/or a light-beam dimension computing array and/or an ultrasonic transducer volume computing plane.

After bag 21 is full, it can be transferred by the consumer to platform 28. In FIG. 1, such a bag 24 is shown resting on platform 28. Note also that platform 28 contains a pole 26 which in turn contains hooks 27. Additional bags can be hung on hooks 27. Platform 28 lies on a weighing scale 29, herein referred to as the 'storage scale'.

Pole 30 is attached to the cabinet 162 of the robot module (it does not make any contact whatsoever with platform 28). Mounted on the top of pole 30 is a surveillance camera 32 and a surveillance monitor 31. Surveillance camera 32 transmits video images of the consumer and the immediate region around the consumer. These images are sent to the supervisor module as well as being displayed on the surveillance monitor 31. Thus, the consumer can see images of himself/herself on monitor 31 and thus is aware that his/her actions are being monitored by the supervisor employee.

Cabinet 162 and cabinet 17 of the robot module do not have openings. As well, platforms 22 and 28 occupy most of the horizontal space over cabinet 162. An important feature of the present invention is that it is difficult for a customer to leave aside an item he/she does not scan so as to avoid paying for the item by simply bagging the item when the order is completed and he/she is taking the bags from platforms 22 and 28. Any item the customer places on platforms 22 or 28 will cause a weight change to be detected by the packing scale 23 or the storage scale 29. If the item has not been scanned, the machine will prompt the customer to remove the item, as discussed later below. If the customer leaves an item on the laser scanner 14 or on the surface 16 adjacent to the laser scanner, the supervisory employee will be able to see these items via the video image recorded by camera 32.

The surface 16 adjacent to the laser scanner 14 is a useful feature of the present invention. Surface 16 allows the customer to place a shopping basket 15 adjacent to the laser scanner 14. In the case whereby the customer uses a shopping cart, surface 16 serves as a small area where the customer can unload items from the shopping cart before deciding exactly which items should be scanned first.

A key feature of the present invention is the proximity of the laser scanner 14 to the packing scale 23. This proximity allows the customer to scan and then bag an item in one single step.

Supervisor Module

The supervisor module, as shown in FIG. 2, allows a store employee to supervise the operation of the robot module of FIG. 1. Together, FIG. 1 and 2, i.e., the robot module and the supervisor module, constitute an embodiment of the present invention. As mentioned above, the present embodiment depicts a supervisor module which is capable of supervising two different robot modules. However, other embodiments can be envisioned which allow the store employee to supervise greater number of robot modules.

Since the supervisor module shown in FIG. 2 is intended to supervise the operation of two robot modules, the present embodiment of the supervisor module contains two of all parts. An exception is that it contains only one microphone 61 which must be shared between two robot modules via microphone switch buttons 62 and 63. From the point view of reliability there are advantages to keeping the supervisory equipment required for the each of the two robots separate. For example, if one set of supervisory equipment fails, then only one robot will be inoperable since the other set of supervisory equipment is working. However, for reasons of economy, it is possible to envision other embodiments of the supervisor module which share many supervisor components to supervise the operations of many robot modules.

Since the supervisor module contains two sets of symmetrical components, we shall arbitrarily decide to consider the components on the left-hand side of the page as being the components which connect with the particular robot module shown in FIG. 1.

Video monitor 51 displays the video images transmitted by video cameras 18 and/or 32. Video monitor switch 60 controls whether the monitor displays the image from sensor/video camera 18 and/or the image from video camera 32. As is apparent from FIG. 1, sensor/video camera 18 allows the supervisory employee to see the contents of the sac 21 on the packing scale 23. Similarly, video camera 32 allows the supervisory employee to see the actions of the consumer and the area immediately around the consumer.

Video display terminal 53 generally displays the same information shown on video display terminal 11. Thus, the supervisory employee can see what actions the consumer is being instructed to perform at that moment, as well as the summary information about the order (e.g., total cost, items purchased etc) normally displayed to the consumer. Occasionally, video display terminal 53 may contain information not shown on video display terminal 11; generally this is information required by the supervisory employee but not by the consumer, e.g., an acceptable weight tolerance for a certain product. In other embodiments of the present invention whereby it is desired to economize as much as possible on components required for the supervisor module, video display terminal 53, as well as video monitor 51, would contain alternating or reduced size or summarized images and information from several different robot modules.

Microphone 61 allows the supervisory employee to talk with the consumer. Note that in the present embodiment of the invention, there is only one microphone for the two robots served by the supervisory module. The supervisory employee must press microphone switch 62 on the supervisor keyboard 57 to transmit a message to the speaker system 12 of the specific robot module shown in FIG. 1.

Receipt printer 55 prints a receipt for the consumer. If a seperate receipt printer is used for each robot, as shown in the present embodiment, then every time the consumer scans an item and places it in sac 21, it makes sense to print out the item purchased and its price. When the consumer has finished his/her order, the reciept will have already largely been completed thus saving time. As well, if there are any problems during the order, the operator can examine the receipt to very quickly see what items have been purchased (although the latter information is also generally available via the video display terminal 53). Receipt printers, as one skilled in the art knows, are available commercially from many different manufacturers with many different features. Some receipt printers have the ability to print in color, while others may have the ability to print bar coded coupons. In general, receipt printers print a 40 column or narrower receipt for the consumer, as opposed to the 80 or 132 column printers used by many data processing systems.

Operator keyboard 57 consists of a group of buttons which the supervisory employee uses to control the robot. For example, if a product which has no bar coded label is placed in sac 21, then the supervisory employee may be expected to enter a code and/or approve the item via the operator keyboard 57. Other embodiments of the present invention are also possible whereby the operator keyboard 57 is replaced by other means of user interface, e.g., voice recognition circuitry, interruption of beams of light by a pointing finger, joystick, etc.

Cash drawer 64 is metal cash drawer which can be opened by the computer in cabinet 66 of the supervisory module. For example, if a consumer intends to pay in cash and his/her order is finished, then the consumer would walk over the supervisory module and give the supervisory employee cash. The supervisory employee would enter the amount of cash into the computer via the operator keyboard 57. The computer would then open the cash drawer 64 to deposit the payment and to make change, if necessary, for the consumer. In the embodiment of the present invention shown in FIG. 2, a separate cash drawer is used for each robot that the supervisor modules supervises. However, one can also produce an embodiment of the present invention whereby one cash drawer is shared by several robots. Similarly, although not shown in FIGS. 1 or 2, one skilled in the art is aware that other means of paying for purchases are in commercial existence. These means include cheques, credit cards, debit cards, store vouchers, and store cards. Apparatus to process such means of payment, as well as apparatus that automatically reads legal currency and provides coin change, is commercially available and can be built into the robot module of FIG. 1 to allow the consumer to automatically pay for his/her order. For examine, a commercially available credit card reader apparatus could be attached to pole 30. The consumer would place his/her credit card in such apparatus at the end of the order to pay for the order without any assistance by the human supervisory employee. Similarly, it is possible to envision a commercially available currency reader to be attached to pole 30 to allow the consumer to pay for the order with cash without any assistance by the human supervisory employee.

Functional Description

Figure 3:
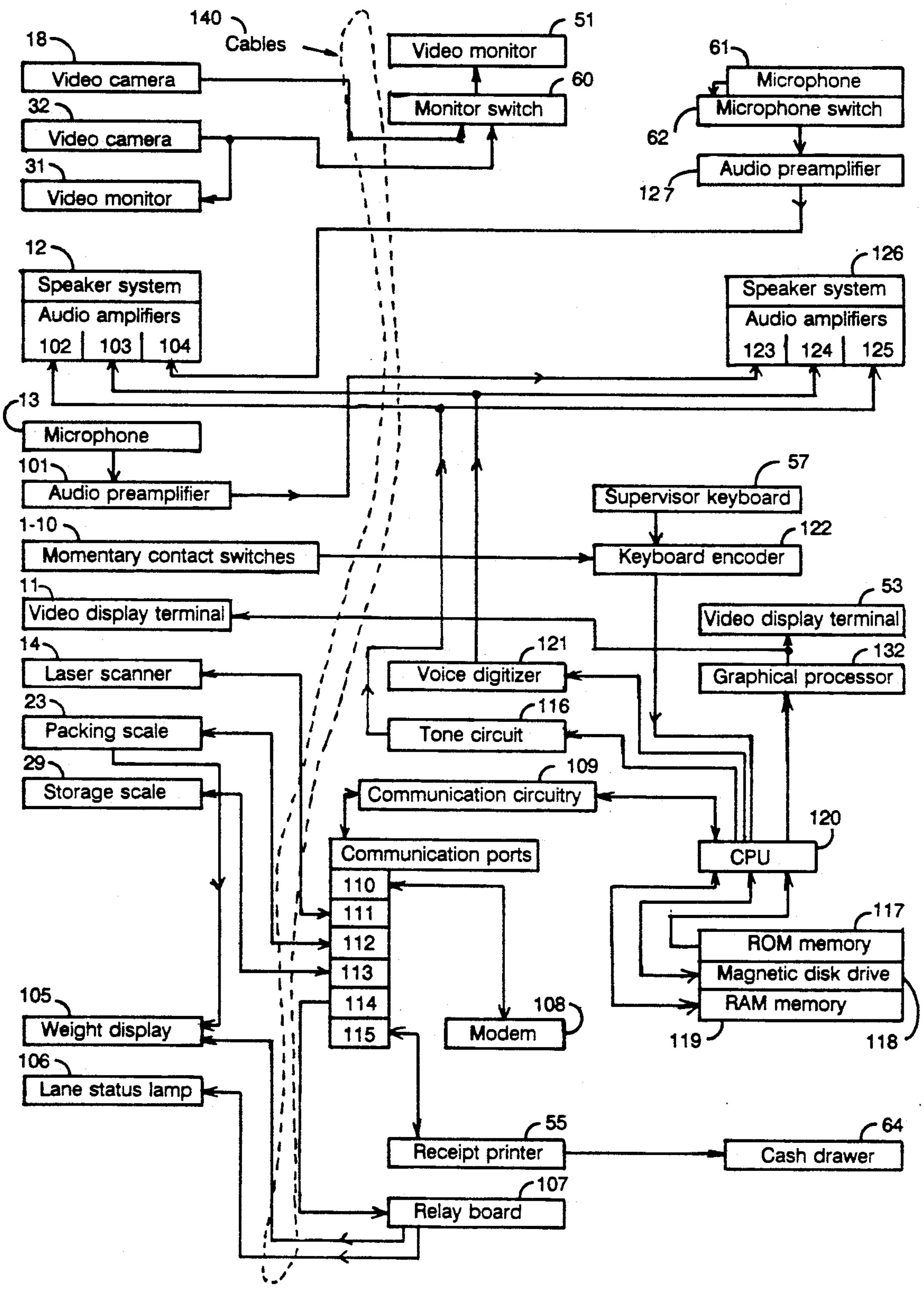
FIG. 3 is a block diagram of the invention.
Figure 4A:
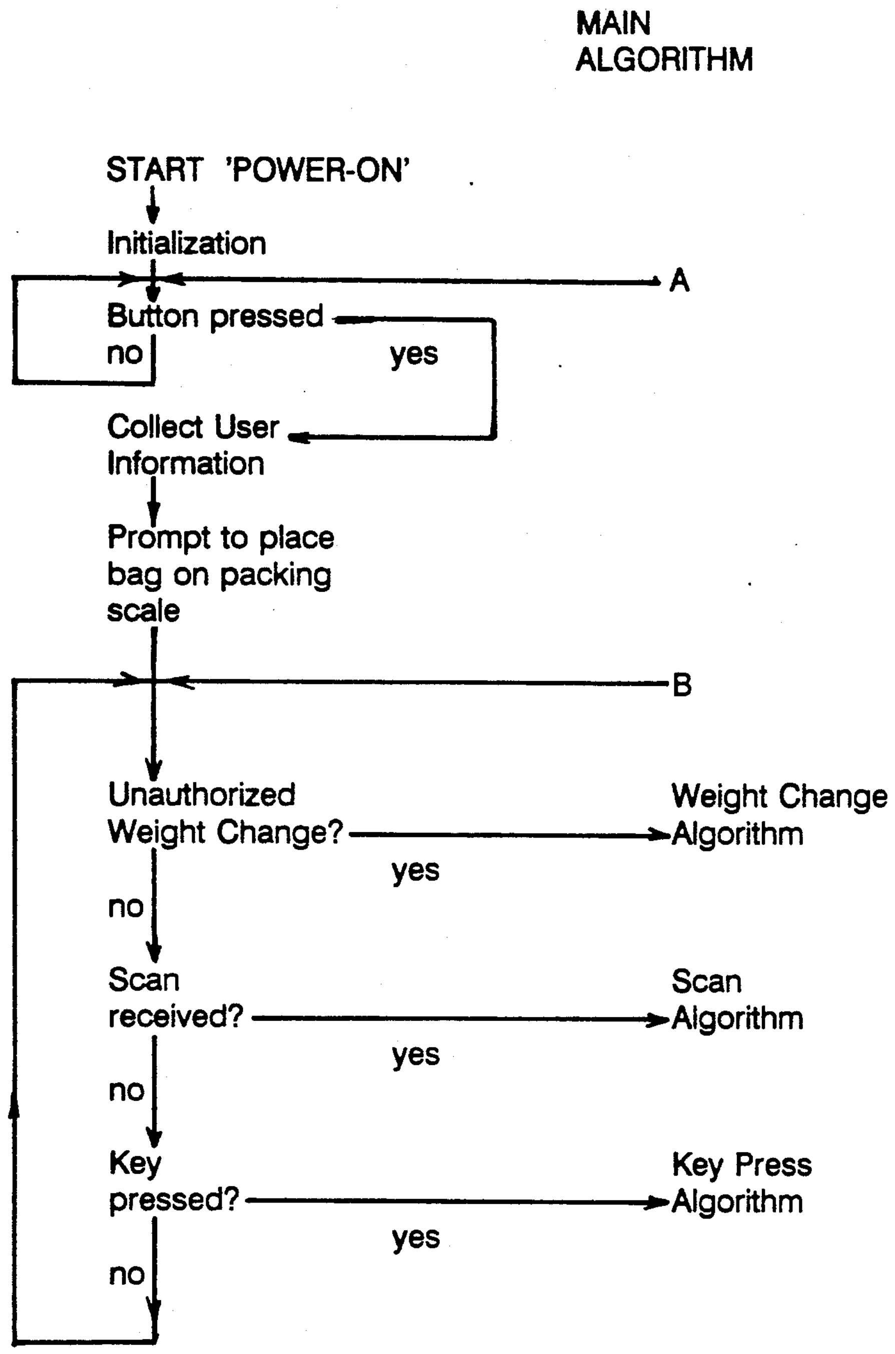
Figure 4B:
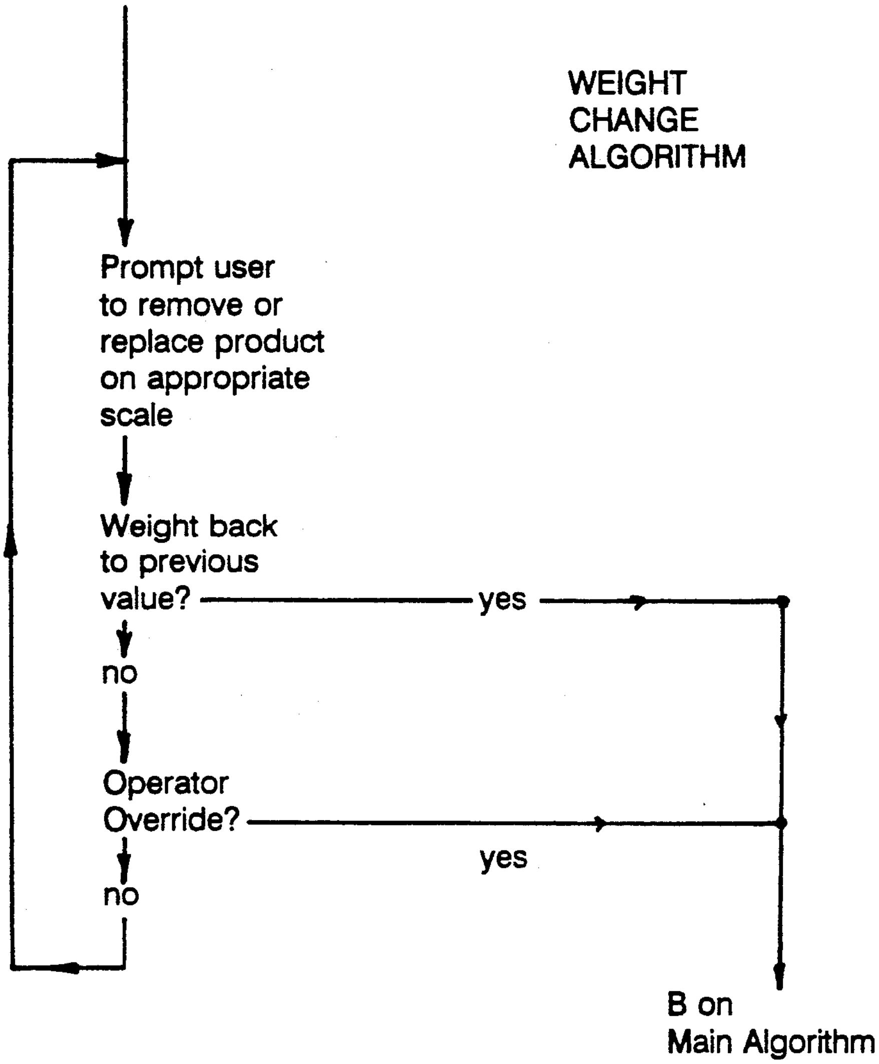
Figure 4C:
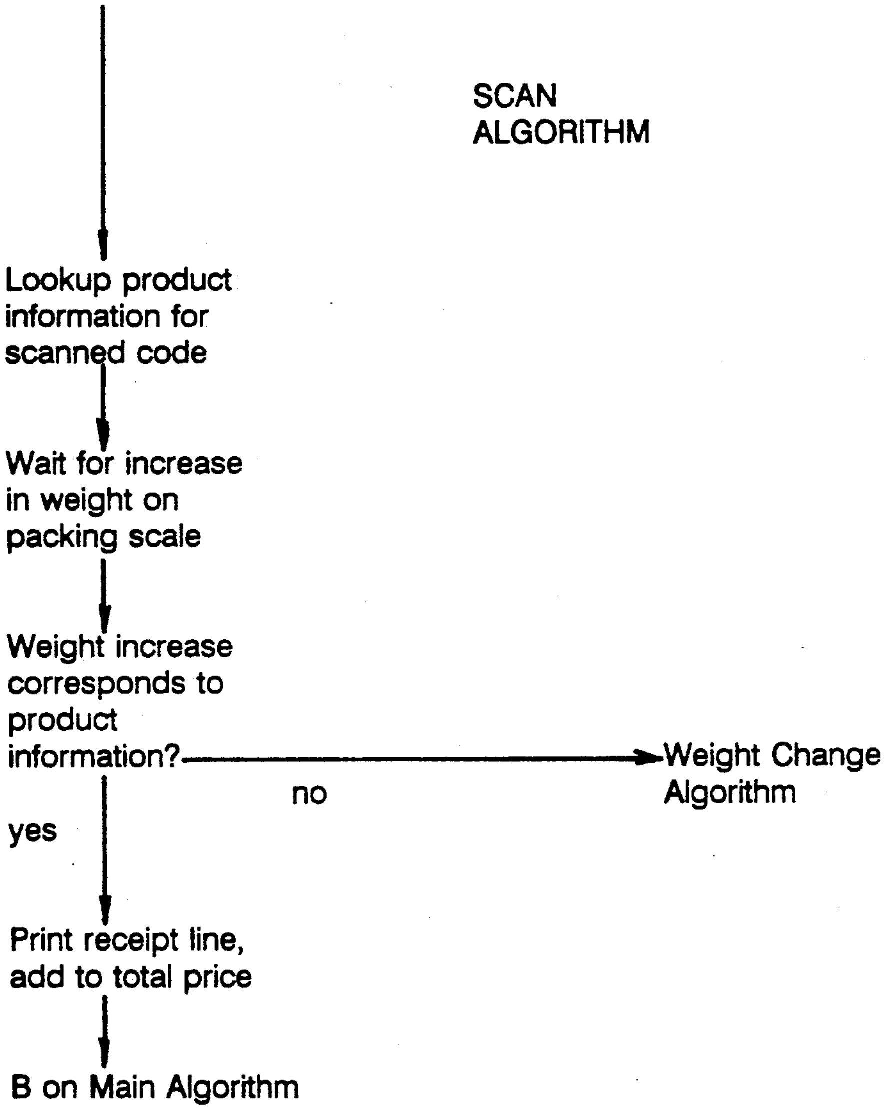
Figure 4D:
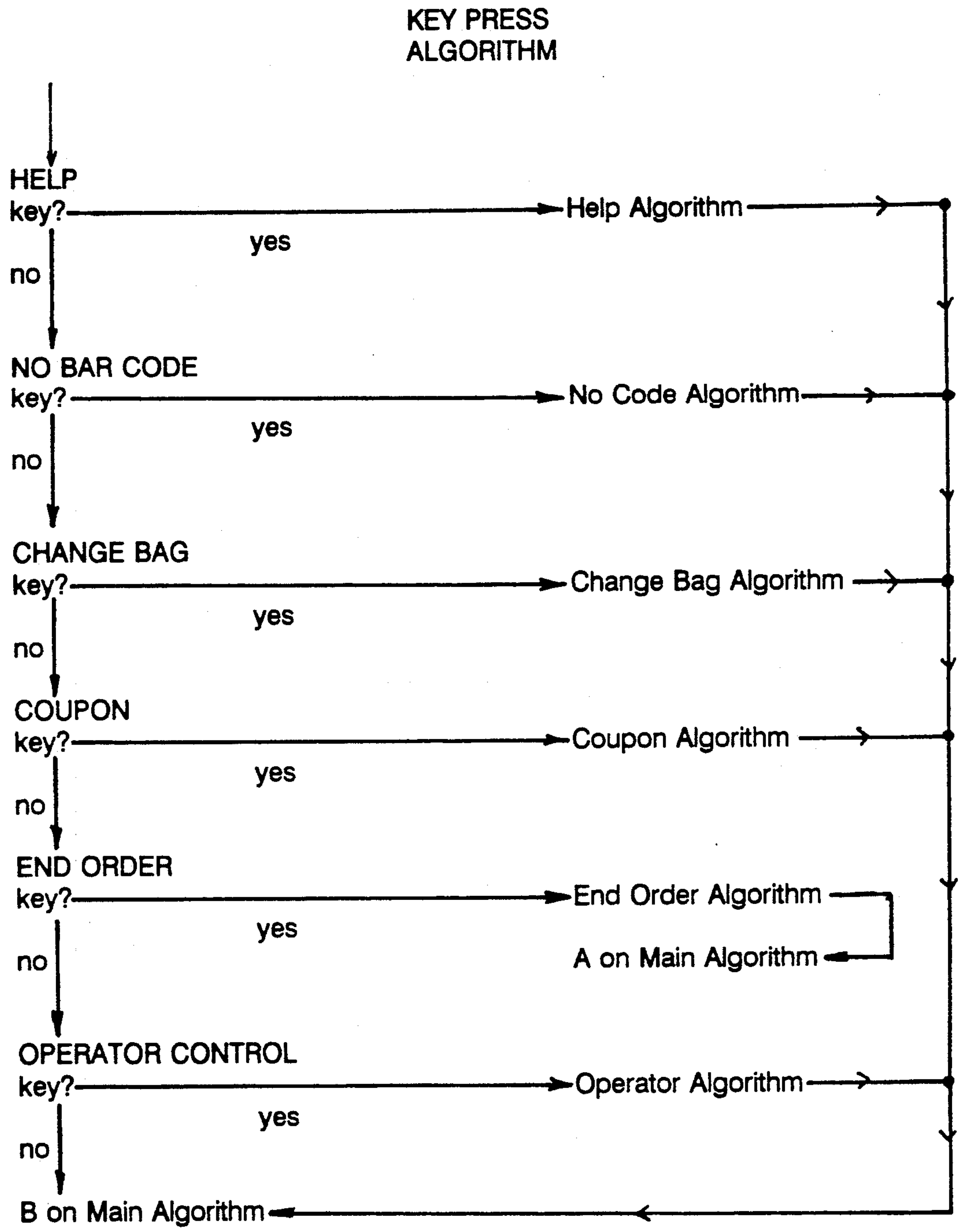

Turning now to FIG. 3, there is shown a block diagram corresponding to preferred embodiment of the automatic POS machine shown in FIGS. 1 and 2. The components of the robot module and the components of the supervisor module (i.e., the portion of the supervisor module devoted to that robot) are connected by a cable 140. In the preferred embodiment, cable 140 is composed of video cable capable of transmitting higher bandwidth video signals, lower capacity audio cable and data communication cable for transmitting the data processing signals to and from the communication ports 109 and the keyboard encoder 122.

Note that FIG. 3 is composed of three largely independent systems. These can be considered as the 'video system', the 'audio system' and the 'information system'.

The 'video system' of the robot module consists of the color sensor/video camera 18, the black and white surveillance video camera 32, the black and white video monitor 31 which displays the image from camera 32. (If in another embodiment sensor 18 consists of dimensional measuring and volume measuring sensors as well as a video camera, then please note that only the video camera portion would be part of the 'video system'. The dimensional and volume measuring sensors would interface with the 'information system'.) Signals from the color camera 18 and the surveillance camera 32 are sent to the supervisor module. At the supervisor module, monitor switch 60 allows the supervisory employee to decide whether to display on video monitor 51 the image from the camera 18 and/or the image from the surveillance camera 32. One purpose of the 'video system' is to allow the supervisory employee to see what items are being placed in the sac 21 on the packing scale 23. Occasionally items may not have a bar coded label and the supervisory employee may be expected to enter a code or to a approve a product number chosen by the consumer. As well, it is useful for the supervisory employee to occasionally check if the contents of the bag correspond with the products scanned (in addition to the automatic weight checking that the machine performs for all products). Another purpose of the 'video system' is to allow the supervisory employee to see what the consumer is doing. If the consumer requires assistance and speaks to the supervisory employee via the microphone 13, the supervisory employee will be better able to aid the consumer since the employee can see via video monitor 51 what the consumer is doing right or wrong. Another purpose of the 'video system' is to psychologically deter the consumer from trying to fraudulently defraud the machine. By displaying the video image of the consumer on video monitor 31 located in the robot module, the consumer is constantly reminded that his/her actions are being monitored and thus is less likely to try to defraud the machine.

The 'audio system' of the robot module consists of microphone 13 which attaches to preamplifier 101, and speaker system 12 driven by audio amplifiers 102, 103, and 104. The 'audio system' of the supervisor module consists of microphone 61 which attaches to microphone switch 62 which attaches to preamplifier 127 and speaker system 126 which is driven by audio amplifiers 123, 124, and 125. One purpose of the 'audio system' is to allow two way audio communication between the consumer and the supervisory employee. The consumer can ask questions, for example, via microphone 13 which attaches to preamplifier 101 and whose signal is reproduced by speaker system 126 of the supervisor module. The supervisory employee can respond to questions via microphone 61 which is switched to a particular robot module via switch 62 and which then attaches to preamplifier 127 whose signal is reproduced by speaker system 12 of the robot module. Speaker systems 12 and 126 also receive and reproduce digitized voice and tonality signals from the 'information system'. For example, if the 'information system' wants the user to place sac 21 on the storage scale 29, the 'information system', via the voice digitizer circuit 121 will send a human sounding voice to the robot module and the supervisor module speaker systems 12 and 126. This voice would instruct the consumer, for example, to place sac 21 on storage scale 29. For example, if the consumer presses an incorrect button, the 'information system' may send a thudding tonality signal via the tone circuit 116 to speaker systems 12 and 126.

The remainder of the components shown in FIG. 3 can be taken to make up the 'information system'. The 'information system' is controlled by the CPU (Central-Processing-Unit) 120. Many powerful, compact and yet economical CPU's are commercially available. As one skilled in the art recognizes, CPU 120 can retrieve computer programs from magnetic disk drive 118 and from ROM (read-only-memory) program memory 117. Magnetic disk drive 118 is also used to store information such as product codes of the store's inventory, prices, other product specific information, images of products, images intended to help the user use the machine, and digitized representations of various words and phrases. For timely operations, it is advantageous for CPU 120 to process data stored temporarily in the RAM (random-access-memory) 119. As one skilled in the art knows, it is possible to construct CPU 120, RAM 119, and program and data storage circuit equivalent to magnetic disk drive 118 and ROM 117, from discrete transistors, resistors, capacitors and interconnecting wires. However, advances in technology have allowed the thousands of transistors required for an appropriate CPU 120, an appropriate RAM 119, an appropriate ROM 117 and an appropriate magnetic disk drive 118 to be placed on a relatively small amount of integrated circuits. Advances in technology have also allowed one or two small rotating rigid magnetic platters to form the mechanical basis for an appropriate magnetic disk drive 118. As one skilled in the art knows, the algorithm which controls the CPU 120 can be implemented with discrete transistors, resistors, capacitors or can be implemented entirely in the ROM 117. However, due to advances in technology, as one skilled in the art is aware, algorithms controlling CPU's are largely kept on magnetic disk (occasionally tape) drives. By keeping algorithms stored on magnetic disk drives, future modification becomes simple as it is easy to read and write programs from and to magnetic disk drives. As well, due to advances in technology, many of the algorithms for controlling what is often described as the 'low-level functions', i.e., the creation and movement of the data communication signals, are commercially available from numerous sources. In the present invention, it would seem that the algorithm, or program, controlling the operation of CPU 120 is somewhat removed from the physical basis of the invention. However, in reality, it is simply that current technology makes it economically advantageous to use several layers of algorithms, whereby the lower layers are inexpensive, generically available algorithms.

Although, as mentioned above, the 'video system', the 'audio system' and the 'information system' are largely independent, the 'information system' does in fact send audio signals to the 'audio system'. CPU 120 can instruct tone circuit 116 to produce various tones, e.g., beeps, thuds, alarm tones, which are then sent to the speaker system 126 in the supervisor module and the speaker system 12 in the robot module. Similarly CPU 120 can instruct the voice digitizer circuit 121 to reconstruct various digitized words or phrases, whose digital representations are currently in RAM 119, and to send the reconstructed audio signal to the speaker system 126 in the supervisor module and speaker system 12 in the robot module.

CPU 120 can instruct the graphical processing circuitry 132 to display characters representing prices, product descriptions, etc, in various colors, on the supervisor module's video display terminal 53 and simultaneously on the robot module's video display terminal 11. CPU 120 can also instruct the graphical processing circuitry 132 to reconstruct various digitized video images, whose digital representations are currently in RAM 119, and to display these images on video display terminals 53 and 11. Such images can consist of illustrations showing the customer how to use the machine, eg, scanning products, placing products in the bags, pressing buttons, etc; images corresponding to products being scanned or those which the customer must select from; images consisting of characters in fonts which are generally larger than is usual for characters to be displayed on video display terminals.

The customer can communicate with the 'information system' via buttons (generally momentary contact switches) 1 to 10, strategically located around the video display terminal 11. For example, if a product does not have bar coded product code, it is necessary for the customer to press one of the above buttons to indicate this to the 'information system'. Similarly, the supervisory employee can communicate with the 'information system' via the supervisor keyboard 57. For example, if the supervisory employee must visually approve a product which does not have a bar coded product code, then he/she will have to press an appropriate button on the supervisor keyboard 57. Buttons 1 to 10 and the supervisor keyboard 57 attach directly, or send an encoded data signal, to keyboard encoder 122. Keyboard encoder 122 transforms the signals from buttons 1 to 10 and from the supervisor keyboard 57 into data signals compatible with CPU 120, to which the keyboard encoder 122 is attached.

CPU 120 communicates with modem 108, the laser scanner 14, the packing scale 23, the storage scale 29, the government regulated weight display 105, the lane status lamp 106, the receipt printer 55 and the cash drawer 64 via the communication ports circuitry 109 and respectively individual communication ports 110, 111, 112, 113, 114, and 115. Note that in the shown configuration communication port 114 sends signals to relay board 107 which in turn controls the weight display 105 and the lane status lamp 106. Note also that in the shown configuration, communication port 115 communicates indirectly with the cash drawer 64 via the receipt printer 55. If the receipt printer 55 receives a predetermined unique string of character(s), then it will in turn send a signal to cash drawer 64 causing it to open.

The functions of laser scanner 14, packing scale 23 and storage scale 29 have been discussed above. Laser scanner 14 will read a bar coded label placed in the path of its laser beam and will convert the information conveyed by the bar coded label into a representation of the product code which can be sent to the CPU 120 via port 111. Packing scale 23 will convert the weight of the products placed on its weighing platform 22 into a data signal which can be sent to the CPU 120 via port 112. Note that packing scale 23 sends a signal to the government regulated weight display 105. In many localities, the law requires that customers be shown the weight registered by a scale which is to be used to weigh products whose price is determined by weight. In cases where the customer is not required to see the actual weight on the scale, or if the weight is shown instead on video display terminal 11, CPU 120 is able to turn off the government regulated weight display via port 114 and relay board 107. CPU 120 is also able to turn on and off, via port 114 and relay board 107, lane status lamp 106. Lane status lamp 106 is an optional feature not shown in FIG. 1. Lane status lamp 106 is a lamp which is generally mounted on pole 30 or on top of camera 18 and indicates to customers that the lane is available for service. Although not shown in the present configuration, it would be possible to include several such lamps and place them on top the storage scale 29, the packing scale 23 and other locations to help the customer use the machine properly. For example, when the customer was to move sac 21 from the packing scale to the storage scale 29, the CPU 120 could cause a lamp mounted on the storage scale to turn on so as to prompt the customer.

Modem 108 allows the 'information system' to communicate with other computer systems. Modem 108 attaches to CPU 120 via communication port 110 and communication circuitry 109. As one skilled in the art is aware, numerous commercially available modems exist which transmit data signals over ordinary phone wires, over specialized phone wires, over local computer networks, asynchronously, synchronously, to microcomputers, to minicomputers and to mainframe computers. A typical use of present invention will be to have numerous robot-supervisor modules report to a centralized computer system. In such a case, the modem 108 would transmit inventory changes to the central computer system. In such a system the central computer system would transmit price changes and new product information to the CPU 120 via the modem 108. As well, changes in the computer program controlling the CPU 120 stored on magnetic disk drive 118 could be changed by the central computer system via appropriate commands to the CPU 120 via modem 108.

Logic Description

FIG. 4 is a flow-chart describing the overall function of the 'information system' of the present invention. As mentioned above, current technology makes it economically advantageous to use several layers of algorithms, whereby the lower layers are inexpensive, generically available algorithms. The high-level algorithm shown in FIG. 4 along with textual discussion of this algorithm is sufficient to allow one skilled in the art to construct a working automatic point-of-sale machine. One skilled in art to construct a working automatic point-of-sale machine. One skilled in the art will also realize that the algorithm shown in FIG. 4 is only one of many possible algorithms which could be used to control the function of the automatic point-of-sale machine.

Referring now to Section A of FIG. 4, this shows the highest algorithm level and is appropriately called the 'Main Algorithm'. When power is applied to the automatic point-of-sale machine and hence to the 'information system' of the latter, the 'Main Algorithm' commences with an initialization routine. The initialization routine, like all the routines shown in FIG. 4, is actually an algorithm. This algorithm is a layer below the 'Main Algorithm' and itself makes use of other algorithms on again even lower levels and so on. The lowest layer of algorithms are those that present and receive 1's and 0's from the CPU 120. Only the high level algorithms are shown in FIG. 4 since many of the lower level algorithms are common, commercially available algorithms, or simple variants thereof, which one skilled in the art would already be familiar with. The initialization routine would typically call other algorithms to initialize the communication port circuitry 109, to transfer files from the magnetic disk drive 118 to RAM 119, etc.

After initialization, the video display terminal 11 display a graphical message to the customer to press any button to begin checkout of one's order. The CPU 120 is instructed to wait for a button 1 to 10 to be pressed. If a customer wishes to use the automatic point-of-sale machine, then he/she will press any button to commence operations. At this point the algorithm instructs the CPU 120 to collect various information from the customer. One useful piece of information is whether the customer has used this machine previously or if he/she is a beginner. The next step is to prompt the customer, via digitized images on the video display terminal 11 and via digitized human-sounding voice phrases from speaker system 12, to place a bag in the bag holders 19 and 20. This prompting algorithm would then have the user press a button to indicate that the bag is in place.

The 'Main Algorithm' now checks three conditions (each, of course, composed of numerous sub-conditions): Has an unauthorized weight change occurred on packing scale 23 or on the storage scale 29? Has the laser scanner 14 read a bar code? Has the user pressed any button 1 to 10 or has the supervisory employee pressed any key on the supervisor keyboard 57.

Let us consider the case whereby the customer tries to steal an item by placing it directly into sac 21 without scanning it first. When the 'Main Algorithm' checks to see if an unauthorized weight change has occurred, it calls lower algorithms which provide the current weight on the packing scale 23 and on the storage scale 29. If the current weight on a particular scale differs by greater than a predetermined error margin, then weight has been added to or removed from the scale, whichever the case may be. Thus, the 'Main Algorithm' will consider the condition of whether an unauthorized weight change to have occurred to be true and will as shown transfer control to the 'Weight Change Algorithm'. Section B of FIG. 4 is a flow-chart of the 'Weight Change Algorithm'. In the above case where the customer placed an object into the sac 21 without scanning it in an attempt to avoid paying for the item, the 'Main Algorithm' would have determined that unauthorized weight had been added to the packing scale 23. Thus the 'Weight Change Algorithm' would display an appropriate digitized video image on the video display terminal 11 and play an appropriated digitized human audio message from speaker system 12 prompting the customer to remove the item from the sac 21. At the end of the prompt, the 'Weight Change Algorithm' checks to see if the weight on the packing scale 23 is back to the previous weight, i.e., has the item been removed. If it is back to the previous weight then the 'Weight Change Algorithm' ends and control is transferred back to point 'B' on the 'Main Algorithm'. If the weight has not returned back to the previous value, or if the customer has tried to remove a different item resulting in a lower weight but one not equal to the previous value, then the visual and audio prompt is repeated. Note that supervisory employee can press a button on the supervisor keyboard 57 to leave the 'Weight Change Algorithm' and return back to point 'B' on the 'Main Algorithm'.

Let us assume that the customer has taken out of the sac 21 the item in question in the above case. Thus control has passed back to the 'Main Algorithm' where the latter is continually examining whether an unauthorized weight change has occurred, whether a bar code has been scanned or whether a key has been pressed. Now let's assume that the customer scans the item over the laser scanner 14 and then places the item in the sac 21. The laser scanner 14 will convert the bar code into the corresponding product code and send this code via the port 111 and the communication port circutry 109 to the CPU 120. Thus the condition 'Scan Received' will become true and thus, as shown in FIG. 4 control will go to the 'Scan Algorithm'.

Section C of FIG. 4 is a flow-chart of the 'Scan Algorithm'. The 'Scan Algorithm' first takes the product code and looks up information for this product code. Lower level algorithms are used to maintain a database of all product items and to allow quick retrieval from such a database. The product information for a given product code would typically consist of price, description, weight, weight tolerances to accept, tax information, inventory information, and discount information. The 'Scan Algorithm' then calls an algorithm which waits for an increase in weight on the packing scale 23. When this weight increase has occured and the weight reading from scale 23 is considered stable, the 'Scan Algorithm' considers the condition of whether the weight increase on packing scale 23 is within the weight range specified by the product information for that product. If the weight increase is considered within range, then the 'Scan Algorithm' goes to the next step where it causes receipt printer 55 to add the product to the receipt. The product description and price, as well as the current total price of the order is displayed on the video display terminal 11 (as well as video display terminal 53). The 'Scan Algorithm' then ends and control is transferred back to point 'B' on the 'Main Algorithm'. If, on the other hand, the weight increase is not within the specified range, the 'Scan Algorithm' will transfer control to the 'Weight Change Algorithm'. As described above, the 'Weight Change Algorithm' will prompt the user to remove the item from the grocery sac.

Let us assume that control has passed back to the 'Main Algorithm' where the latter is continually examining whether an unauthorized weight change has occured, whether a bar code has been scanned or whether a key has been pressed. Now let's assume that the customer has an item which has no bar code label. When the 'Main Algorithm' is continually examining whether an unauthorized weight change has occured, whether a bar code has been scanned or whether a key has been pressed, it displays on the video display terminal 11 ten arrows pointing to the ten buttons 1 to 10. Each arrow is labelled. For example, let us consider an embodiment of the present invention whereby the arrow to button 1 is labelled 'HELP', the arrow to button 2 is labelled 'NO BAR CODE', the arrow to button 3 is labelled 'CHANGE BAG', the arrow to button 4 is labelled 'END ORDER', the arrow to button 5 is labelled 'COUPON' and that the arrows to buttons 6 to 10 are not labelled. The customer will thus press button 2, which corresponds to the label 'NO BAR CODE' on the video display terminal 11. The customer then places the item in sac 21.

The condition 'Key Pressed' will become true after the customer presses button 2 ('NO BAR CODE'). Thus, control will pass from the 'Main Algorithm' to the 'Key Press Algorithm'. Section D of FIG. 4 is a flow-chart of the 'Key Press Algorithm'. As shown in this figure, since the condition 'No Bar Code Key Pressed' is true, the 'Key Press Algorithm' calls the 'No Code Algorithm'. In the case of a user using the automatic point-of-sale machine for one of his/her first times, the 'No Code Algorithm' alerts the supervisory employee with a visual message on video display terminal 53 and an audio message from speaker system 126 that an item having no bar code has been placed in sac 21. The supervisory employee will examine the video image of sac 21 transmitted by camera 18 and displayed on video monitor 51 and via the supervisor keyboard 57 key in the product code or a product description which will allow a lower-level algorithm to use to determine the product code. In the case of an experienced customer, the 'No Code Algorithm' will present the customer with a menu of choices. Such a menu consists of a graphical image displayed on video display terminal 11 consisting of ten arrow pointing to the ten buttons 1 to 10, each with a label of product choice or another sub-menu to choose from. After the customer has chosen the product, the supervisory employee is prompted to examine the video image of the sac 21 transmitted by camera 18 to video monitor 51 and to approve or reject the choice. If the customer made a mistake or intentionally chose a cheaper product, the rejection by the supervisory employee will cause the 'No Code Algorithm' to start over again. In any case, when the 'No Code Algorithm' is successfully completed, control transfers back to point 'B' on the 'Main Algorithm'.

Let us consider the other buttons which the customer can press. As mentioned above, let us consider an embodiment of the present invention whereby the arrow to button 1 is labelled 'HELP', the arrow to button 2 is labelled 'NO BAR CODE', the arrow to button 3 is labelled 'CHANGE BAG', the arrow to button 4 is labelled 'END ORDER', the arrow to button 5 is labelled 'COUPON' and that the arrows to buttons 6 to 10 are not labelled. If button 1 ('HELP') is pressed then control is transferred to the 'Key Press Algorithm' which in turn calls the 'Help Algorithm'. The 'Help Algorithm' alerts the supervisory employee and prompts the customer to speak into microphone 13. Microphones 13 and 61 and speaker systems 12 and 126 allow the customer and the supervisory employee to carry on a two-way conversation. As well, the supervisory employee can press the monitor switch 60 to display the image from camera 32 on video monitor 51 which is the video image of the customer and his/her immediate surroundings. Section D of FIG. 4 shows that after the 'Help Algorithm' is finished, control returns to point 'B' on the 'Main Algorithm'. This is the general case, although not shown is the possibility for the supervisory employee to branch to different parts of the 'Main Algorithm' as well as various lower level algorithms.

We have already considered the case of pressing the 'NO BAR CODE' button 2. Let us now consider the case of pressing the 'CHANGE BAG' button 3. If the customer has a large order requiring several bags, then when the customer wants to use a new bag, he/she should press the 'CHANGE BAG' button 3. Control is transferred from the 'Main Algorithm' to the 'Key Press Algorithm' and in turn to the 'Change Bag Algorithm'. The 'Change Bag Algorithm' prompts the customer to transfer bag 21 to platform 28 or the hooks 27 on the platform 28 of the storage scale 29. The customer is prompted via a digitized video image on the video display terminal 11 and via a digitized human-sounding voice from the speaker system 12. The customer is asked to transfer bag 21 to the storage scale 29 and then place a new bag on the bag holders 19 and 20 of packing scale 23. The customer is asked to press any button 1 to 10 when ready. At this point the 'Change Bag Algorithm' verifies that the weight increase on storage scale 29 is equal to the previous weight on packing scale 23. If the customer tried to add an extra non-scanned item to the storage scale during changing of bags or tried to swap an inexpensive item with a more expensive non-scanned item then there will generally be a weight discrepancy and the 'Change Bag Algorithm' will ask the user to correct the situation repeatedly until the weight on the storage scale is within the a predetermined tolerance range. When the 'Change Bag Algorithm' is successfully completed control passes back to point 'B' on the 'Main Algorithm'.

Let us now consider the case of pressing the 'END ORDER' button 4. When the customer has completed scanning and bagging his/her order, he/she should press the 'END ORDER' button 4. Control is transferred from the 'Main Algorithm' to the 'Key Press Algorithm' and in turn to 'End Order Algorithm'. The 'End Order Algorithm' prompts the customer, via the video display terminal 11 and speaker system 12, for any final information required such as delivery choices and payment modalities. The typical embodiment of the present invention then instructs the customer to pay the human supervisory employee. However, it is not hard to imagine other embodiments which use commercially available magnetic credit card readers for credit or debit card payment, commercially available electronic debit card readers for debit card payment or commercially available currency readers for automatic cash payment. In the typical embodiment, after the supervisory employee has received payment, the customer is given the receipt for the order. If a cash payment was made then the 'End Order Algorithm' will instruct the port 115 to signal the receipt printer 55 to open the cash drawer 64. The 'End Order Algorithm' then makes sure that there have been no unauthorized weight changes on packing scale 23 or storage scale 29. The customer is now free to remove his/her bags from the packing scale 23 and the storage scale 29. Note that when the 'End Order Algorithm' finishes, control returns to point 'A' on the 'Main Algorithm', i.e. the automatic point-of-sale machine waits for the next order.

Let us now consider the case of pressing the 'COUPON' button 5. When the customer has a discount coupon for a particular product or perhaps a general credit voucher he/she should press the 'COUPON' button 5. Control is transferred from the 'Main Algorithm' to the 'Key Press Algorithm' and in turn to 'Coupon Algorithm'. In the case of a user using the automatic point-of-sale machine for one of his/her first times, the 'Coupon Algorithm' will simply have the receipt printer 55 print a short note or a symbol that will alert the cashier at the time of payment that there is a credit adjustment to be made. In the case of a more experienced user, the 'Coupon Algorithm' will prompt the user to enter the amount of the coupon or voucher via a human sounding voice from speaker system 12 and via a graphical message displayed on the video display terminal 11. The image on the video display terminal 11 will consist of the arrows pointing to the ten buttons 1 to 10 labelled '1' to '10' so that the customer is able to use buttons 1 to 10 to enter the monetary amount of the coupon or the voucher. In the future, coupons that have bar codes on them will become more widespread. For the case of such coupons, the customer need only scan the coupon over the laser scanner 14 instead of having to enter the coupon amount. After the 'Coupon Algorithm' has successfully finished, control passes back to point 'B' on the 'Main Algorithm'. Note that the graphical image displayed on the video display terminal 11 changes back to the usual image that displays arrows pointing to the buttons labelled 'HELP', 'NO BAR CODE', 'CHANGE BAG', 'END ORDER' and 'COUPON', as discussed above.

In the embodiment of the present invention that is being considered here, buttons 6 to 10 have no particular label or significance for the 'Main Algorithm' at point 'B' of the algorithm, FIG. 4. If one of the buttons 6 to 10 are pressed, the condition 'Key Pressed' becomes true so that control is passed to the 'Key Press Algorithm'. However, none of the primary conditions of the 'Key Press Algorithm' becomes true so that control passes back to point 'B' of the 'Main Algorithm' without any particular operations occurring. (Of course, one can envision equivalents of the present embodiment of the invention where pressing such a key causes a prompt such as a thudding sound from speaker 12 to occur.)

It is occasionally necessary for the supervisory employee to enter a product for a customer or make a correction. If the supervisory employee presses a key on the supervisor keyboard 57 then control passes to the 'Key Press Algorithm' and in turn to the 'Operator Algorithm'. The 'Operator Algorithm' consists of a series of conditional tests, similar to the structure of the 'Key Press Algorithm' which acts appropriately depending on which key on the supervisor keyboard 57 was pressed. For example, if the supervisory employee pressed a key to allow the customer to remove an item from the sac 21 he/she decided at the last minute he/she did not want to purchase, then the 'Operator Algorithm' would call a lower-level 'Remove Item Algorithm' which would in turn call lower-level algorithms to reduce the total amount of the order, to print a correction on the receipt via receipt printer 55, to verify the new weight on packing scale 23, etc.

The high-level algorithms shown in FIG. 4 along with textual discussion of these algorithms is intended not as a comprehensive discussion of the algorithms used in an embodiment of the present invention, but only to be sufficient to allow one skilled in the art to construct a working automatic point-of-sale machine. One skilled in the art will be capable of producing or obtaining the lower-level algorithms dictated by the algorithms shown in FIG. 4. The set of algorithms shown in FIG. 4 is only one of many possible sets of algorithms which could be used to control the function of the automatic point-of-sale machine. Using no more that routine experimentation it is possible to produce many equivalent sets of algorithms. Similarly, using no more than routine experimentation it is possible to add numerous features to the set of algorithms shown in FIG. 4. For example, a feature could be added to the 'Scan Algorithm' shown in Section C of FIG. 4, whereby if the product information indicated that the product was heavy or of large size, then the customer would be prompted to place the product directly on the storage scale 29 instead of the packing scale 23. This algorithm could also be modified so that if the product information indicated that another product had a similar weight, then the supervisory employee should be prompted to verify that the correct product has been placed in the sac 21 or on the storage scale 29, whichever the case may be. The 'No Code Algorithm' could be given a feature such that if the supervisory employee is very busy or cannot respond within several seconds, then for the case of an experienced customer who has indicated via buttons 1 to 10 in response to choices presented on the video display terminal 11 the product placed in sac 21, then the product will by default be approved so that the customer does not have wait an unreasonable amount of time for the supervisory employee to approve or reject the item.

An embodiment of the present invention may concisely be described as a self-service checkout system comprising: (a) a robot module; (b) a laser bar code scanner mounted in said robot module for generating a first electrical signal corresponding to the bar code scanned; (c) a packing scale mounted in said robot module for generating a second electrical signal corresponding to the weight on said packing scale where said packing scale is mounted in proximity to the said laser bar code scanner such that a customer can scan and bag a product with one motion; (d) attachments on the said packing scale to hold bags open and in place; (e) a video display mounted in said robot module; (f) user interface means operating in proximity to said video display generating a third electrical signal; (g) a sensor mounted above the said packing scale where said sensor generates a fourth electrical signal representative of the external characteristics of the contents of the packing bags; (h) a supervisor module to be used by a supervisory employee to supervise the operation of said robot module; (i) user interface means mounted in the said supervisor module generating a fifth electrical signal; (j) a video display mounted in said supervisor module; (k) an electronic computer having access to a product lookup table and receiving said first, second, third, fourth and fifth electrical signals; and (l) a computer program causing said electronic computer in the case of a product containing a machine readable bar code, to look up in the said product lookup table the allowable weight for the product and to verify correspondence with the weight addition on the said packing scale, and in the case of a product without a valid machine readable bar code to present the customer with a series of choices to identify the product including the option of requesting the said supervisory employee to identify the product.

As mentioned above, for the sake of simplicity, in the embodiment being discussed here, 18 is considered to be a sensor transmitting only images of the contents of bag 21 to the supervisor module. However, as mentioned above, sensor 18 may in other embodiments contain a three-dimensional array of light beams and detectors which measure the dimensions of the customer's hand and product going to the bag 21 and the customer's empty hand returning from bag 21 thus allowing computation of the net dimensions of the product. Sensor 18 may also contain an plane of ultrasonic transducers which measure the distance from the fixed position of sensor 18 to the top of the contents of the bag 21. By noting the change in these distances after a product is placed in bag 21, it is possible to compute the volume of the product. In an embodiment where sensor 18 consists of a video camera and a light-beam dimension computing array and an ultrasonic transducer volume computing plane, the measured dimensions and volume will be verified against dimensions and volume stored for a particular product, as indicated by the product lookup table. Dimensions and volume may be verified for every single item placed in bag 21, or as mentioned earlier, dimensions and volume may be used along with weight to determine that a non-labelled product identified by an experienced user has in fact been correctly identified and for the small minority of cases where measured weight,dimensions and volume don't reasonably correspond with the stored values, an image of bag 21 is verified by the supervisory employee.

Those skilled in the art will be able to ascertain, using no more than routine experimentation, -other equivalents for the method and apparatus above described. Such equivalents are to be included within in the scope of the following claims.

I claim:

1. A self-service checkout system comprising:

(a) a robot module;

(b) a laser bar code scanner mounted in said robot module for generating a first electrical signal corresponding to the bar code scanned;

(c) a packing scale mounted in said robot module for generating a second electrical signal corresponding to the weight on said packing scale where said packing scale is mounted in proximity to the said laser bar code scanner such that a customer can scan and bag a product with one motion;

(d) attachments on the said packing scale to hold bags open and in place;

(e) a first video display mounted in said robot module;

(f) first user interface means operating in proximity to said first video display generating a third electrical signal;

(g) a sensor mounted above the said packing scale where said sensor generates a fourth electrical signal representative of the external characteristics of the contents of the packing bags;

(h) a supervisor module to be used by a supervisory employee to supervise the operation of said robot module;

(i) second user interface means mounted in the said supervisor module generating a fifth electrical signal;

(j) a second video display mounted in said supervisor module;

(k) an electronic computer having access to a product lookup table and receiving said first, second, third, fourth and fifth electrical signals, and sending a sixth electrical signal to said first video display and a seventh electrical signal to said second video display;

(l) a computer program causing said electronic computer in the case of a product containing a machine readable bar code, to look up, in response to said first electrical signal, in the said product lookup table the allowable weight for the product and to verify correspondence with the weight addition on the said packing scale as indicated by the said second electrical signal, and in the case of a product without a valid machine readable bar code to present the customer, via said sixth electrical signal via said first video display, with a series of choices to identify the product, via said first user interface means via said third electrical signal, including the option of requesting the said supervisory employee, via said seventh electrical signal via said second display means, to identify the product via said second user interface means via said fifth electrical signal and optionally in response to said sensed external characteristics as indicated by said fourth electrical signal; and (m) a storage scale mounted in close proximity to the said packing scale so that when the said packing scale becomes filled, products and their bags can be transferred to said storage scale which generates an eighth electrical signal which is received and surveyed by the said electronic computer to ensure that no unauthorized products are fraudulently placed on or in the bags on the said storage scale.

2. The self-service checkout system of claim 1 in which a communication link exists between the robot module and the supervisor module to allow communication between the customer and the said supervisory employee.

3. The self-service checkout system of claim 1 containing a television camera and monitor to allow the supervisory employee to verify that before the customer removes his products from the said robot module that no products have been fraudulently put aside.

4. The self-service checkout system of claim 1 containing a receipt printer attached to the said electronic computer to produce a printed list of the customer's purchases and total payment requested.

5. The self-service checkout system of claim 1 whereby said electronic computer contains a human voice generating circuit.

6. The self-service checkout system of claim 1 whereby the said robot module contains a payment reader capable of reading forms of payment characterized by credit cards, debit cards and currency, where such payment reader generates an electrical signal which is received and surveyed by said electronic computer.

7. The self-service checkout system of claim 1 where said electronic computer contains circuitry to allow communications with other electronic computers.

8. The self-service checkout system of claim 1 containing a television camera and monitor to allow the supervisory employee to verify that before the customer removes his products from the said robot module that no products have been fraudulently put aside and containing a monitor visible to the customer to make the customer aware that his/her actions are being surveyed.

9. The self-service checkout system of claim 1 whereby the supervisor module contains a cash drawer.

10. The self-service checkout system of claim 1 whereby the robot module contains angles, sealed surfaces.

11. The self-service checkout system of claim 1 where the said sensor mounted above the packing scale generates high resolution color images of the product in the packing bags.

12. The self-service checkout system of claim 1 where the said sensor mounted above the packing scale contains ultrasonic transducers generating said fourth electrical signal which is representative of the distances from the said sensor to the top of the contents in the packing bags and thus allows the said electronic computer to compute the increase in volume of the contents of the bags on the said packing scale after an item is placed in said bags and to verify correspondence of the thus net volume of the product with the volume specified in the said product lookup table for that particular product.

13. A self-service checkout system comprising:

(a) a robot module;

(b) a laser bar code scanner mounted in said robot module for generating a first electrical signal corresponding to the bar code scanned;

(c) a packing scale mounted in said robot module for generating a second electrical signal corresponding to the weight on said packing scale where said packing scale is mounted in proximity to the said laser bar code scanner such that a customer can scan and bag a product with one motion;

(d) attachments on the said packing scale to hold bags open and in place;

(e) a first video display mounted in said robot module;

(f) first user interface means operating in proximity to said first video display generating a third electrical signal;

(g) a sensor mounted above the said packing scale where said sensor generates a fourth electrical signal representative of the external characteristics of the contents of the packing bags;

(h) a supervisor module to be used by a supervisory employee to supervise the operation of said robot module;

(i) second user interface means mounted in the said supervisor module generating a fifth electrical signal;

(j) a second video display mounted in said supervisor module;

(k) an electronic computer having access to a product lookup table and receiving said first, second, third, fourth and fifth electrical signals, and sending a sixth electrical signal to said first video display and a seventh electrical signal to said second video display;

(l) a computer program causing said electronic computer in the case of a product containing a machine readable bar code, to look up, in response to said first electrical signal, in the said product lookup table the allowable weight for the product and to verify correspondence with the weight addition on the said packing scale as indicated by the said second electrical signal, and in the case of a product without a valid machine readable bar code to present the customer, via said sixth electrical signal via said first video display, with a series of choices to identify the product, via said first user interface means via said third electrical signal, including the option of requesting the said supervisory employee, via said seventh electrical signal via said second display means, to identify the product via said second user interface means via said fifth electrical signal and optionally in response to said sensed external characteristics as indicated by said fourth electrical signal; and (m) in proximity to the said packing scale a three-dimensional array of light beams and light detectors generating an eighth electrical signal which is received by the said electronic computer where interruption of the said light beams by the customer's hand transferring a product to the packing scale and by the customer's empty hand leaving the packing scale causes the said electronic computer to subtract the computed dimensions of the customer's hand alone from the computed dimensions of the customer's hand holding the product and to verify correspondence of the thus net dimensions of the product with the dimensions specified in the said product lookup table for that particular product.

* * * * *